United States Patent
Salter et al.

(10) Patent No.: US 12,049,153 B2
(45) Date of Patent: Jul. 30, 2024

(54) AUTOMATED BIDIRECTIONAL ENERGY TRANSFER SUPPORT SELECTION FOR TRANSIENT LOADS BASED ON BATTERY LIFE MODELING

(71) Applicant: FORD GLOBAL TECHNOLOGIES, LLC, Dearborn, MI (US)

(72) Inventors: Stuart C. Salter, White Lake, MI (US); Ryan O'Gorman, Beverly Hills, MI (US); Peter Phung, Windsor (CA); Katherine Howard-Cone, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 374 days.

(21) Appl. No.: 17/392,673

(22) Filed: Aug. 3, 2021

(65) Prior Publication Data
US 2023/0044022 A1    Feb. 9, 2023

(51) Int. Cl.
*B60L 58/16*    (2019.01)
*B60L 53/14*    (2019.01)
*B60L 53/63*    (2019.01)

(52) U.S. Cl.
CPC .............. *B60L 58/16* (2019.02); *B60L 53/14* (2019.02); *B60L 53/63* (2019.02)

(58) Field of Classification Search
CPC .......... B60L 58/16; B60L 53/14; B60L 53/63; B60L 55/00; B60L 53/68; Y02T 10/70
See application file for complete search history.

(56) References Cited

U.S. PATENT DOCUMENTS

| | | | |
|---|---|---|---|
| 7,590,472 B2 | 9/2009 | Hakim et al. | |
| 9,855,853 B2* | 1/2018 | Cun | B60L 53/64 |
| 10,569,660 B2 | 2/2020 | Lee et al. | |
| 10,871,510 B2 | 12/2020 | Quinn et al. | |
| 10,938,211 B2* | 3/2021 | Bell | B60L 55/00 |
| 11,368,031 B2* | 6/2022 | Qian | H02J 7/1423 |
| 2009/0143929 A1* | 6/2009 | Eberhard | B60L 3/0046 |
| | | | 903/907 |
| 2011/0077789 A1* | 3/2011 | Sun | H02J 3/14 |
| | | | 700/291 |
| 2013/0162025 A1* | 6/2013 | Momose | B60L 53/51 |
| | | | 307/9.1 |
| 2017/0246963 A1* | 8/2017 | Lee | H01M 10/425 |

(Continued)

FOREIGN PATENT DOCUMENTS

WO    2019/034140 A1    2/2019

*Primary Examiner* — Aniss Chad
*Assistant Examiner* — Christopher George Fees
(74) *Attorney, Agent, or Firm* — David B. Kelley; Carlson, Gaskey & Olds, P.C.

(57) ABSTRACT

Systems and methods may coordinate and provide bidirectional energy transfer events between electrified vehicles and other devices or structures, such as for supporting transient loads associated with the devices/structures. Battery life information and driving habit information may be leveraged for selecting an appropriate energy transfer strategy for any given vehicle, traction battery pack, structure, and/or grid power source condition. The proposed systems/methods may thereby align grid demand charge strategies to each vehicle's battery life, thereby preserving the life/warranty and asset utilization of the traction battery pack over the entire usage life of the vehicle.

20 Claims, 8 Drawing Sheets

(56) References Cited

U.S. PATENT DOCUMENTS

| | | | |
|---|---|---|---|
| 2020/0063626 A1* | 2/2020 | Dudar | F01N 11/00 |
| 2020/0161859 A1* | 5/2020 | Bell | H02J 3/14 |
| 2020/0168959 A1* | 5/2020 | Hettrich | H01M 10/052 |
| 2020/0282855 A1* | 9/2020 | Slutzky | B60L 58/16 |
| 2020/0307405 A1 | 10/2020 | Waardenburg | |
| 2020/0353839 A1* | 11/2020 | Tarchinski | B60L 58/12 |
| 2020/0376927 A1* | 12/2020 | Rajaie | B60H 1/00764 |

* cited by examiner

AUTOMATED BIDIRECTIONAL ENERGY TRANSFER SUPPORT SELECTION FOR TRANSIENT LOADS BASED ON BATTERY LIFE MODELING

TECHNICAL FIELD

This disclosure is directed to systems and methods for coordinating and providing automated bidirectional energy transfer support selection for supporting transient loads of other devices or structures based, at least in part, on battery life information.

BACKGROUND

Electrified vehicles differ from conventional motor vehicles because they are selectively driven by one or more traction battery pack powered electric machines. The electric machines can propel the electrified vehicles instead of, or in combination with, an internal combustion engine.

Plug-in type electrified vehicles include one or more charging interfaces for charging the traction battery pack. Plug-in type vehicles are typically charged while parked at a charging station or some other utility power source. Plug-in type vehicles can also be used to support household transient loads during electrical power outages.

SUMMARY

A bidirectional energy transfer system according to an exemplary aspect of the present disclosure includes, among other things, a traction battery pack and a control module programmed to control a bidirectional energy transfer output of the traction battery pack based at least on battery health information associated with the traction battery pack. The control of the bidirectional energy transfer output includes selecting an energy transfer strategy for conducing the energy transfer output.

In a further non-limiting embodiment of the foregoing system, the control module is further programmed to analyze the battery health information within a battery life modeler to derive an amount of battery aging.

In a further non-limiting embodiment of either of the foregoing systems, the control module is further programmed to analyze the battery health information within the battery life modeler to determine a remaining warranty period of the traction battery pack.

In a further non-limiting embodiment of any of the foregoing systems, the control module is a component of an electrified vehicle that is powered by the traction battery pack.

In a further non-limiting embodiment of any of the foregoing systems, the control module is a component of a cloud-based storage system or a structure that is configured to receive the bidirectional energy transfer output from the traction battery pack.

In a further non-limiting embodiment of any of the foregoing systems, the control module is further programmed to control the bidirectional energy transfer output of the traction battery pack based on driving habit information of a user who is associated with an electrified vehicle that is powered by the traction battery pack.

In a further non-limiting embodiment of any of the foregoing systems, the control module is further programmed to select the energy transfer strategy from a plurality of energy transfer strategies, and the plurality of energy transfer strategies include at least one aggressive strategy, at least one assertive strategy, at least one reserved strategy, and at least one extremely reserved strategy.

In a further non-limiting embodiment of any of the foregoing systems, the at least one assertive strategy is a less aggressive strategy than the at least one aggressive strategy, the at least one reserved strategy is a less aggressive strategy than the at least one assertive strategy, and the at least one extremely reserved strategy is a less aggressive strategy than the at least one reserved strategy.

In a further non-limiting embodiment of any of the foregoing systems, the control module is programmed to control the bidirectional energy transfer output from the traction battery pack to a structure for powering a transient load of the structure.

In a further non-limiting embodiment of any of the foregoing systems, the structure is a household associated with an electrified vehicle that is powered by the traction battery pack.

In a further non-limiting embodiment of any of the foregoing systems, the control module is further programmed to command a notification to a user of the electrified vehicle in response to determining that the traction battery pack has an insufficient amount of energy reserve available to support the transient load of the structure under current settings associated with the energy transfer strategy.

A method according to another exemplary aspect of the present disclosure includes, among other things, controlling, via a control module of a bidirectional energy transfer system, a bidirectional energy transfer output from a traction battery pack of an electrified vehicle to a structure that is separate from the electrified vehicle. Controlling the bidirectional energy transfer output includes selecting an energy transfer strategy that is based at least on battery health information of the traction battery pack.

In a further non-limiting embodiment of the foregoing method, the structure is a household associated with the electrified vehicle.

In a further non-limiting embodiment of either of the foregoing methods, selecting the energy transfer strategy includes inputting the battery health information into a battery life modeler and deriving an amount of battery aging of the traction battery pack from the battery life modeler.

In a further non-limiting embodiment of any of the foregoing methods, the method includes deriving a remaining warranty period of the traction battery pack from the battery life modeler.

In a further non-limiting embodiment of any of the foregoing methods, the method includes selecting a more aggressive energy transfer strategy as the energy transfer strategy when the amount of the battery aging does not exceed a predefined amount of aging or when the remaining warranty period is not near an end of the warranty period, and selecting a less aggressive energy transfer strategy as the energy transfer strategy when the amount of the battery aging exceeds the predefined amount of aging or when the remaining warranty period is near the end of the warranty period.

In a further non-limiting embodiment of any of the foregoing methods, the method includes determining a total energy requirement of the structure, determining an amount of energy available from the traction battery pack for supporting a transient load of the structure, and controlling the bidirectional energy transfer output from the traction battery pack to the structure only when the amount of energy available from the traction battery pack exceeds the total energy requirement of the vehicle.

In a further non-limiting embodiment of any of the foregoing methods, the method includes notifying a user that the electrified vehicle is uncapable of supporting the transient load when the total energy requirement of the structure is greater than the amount of energy available from the traction battery pack.

In a further non-limiting embodiment of any of the foregoing methods, the method includes prompting the user to adjust an energy setting associated with the bidirectional energy transfer output.

In a further non-limiting embodiment of any of the foregoing methods, the amount of energy available from the traction battery pack is derived from driving habit information associated with the user of the electrified vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and providing bidirectional energy transfer events between electrified vehicles and other devices or structures, such as for supporting transient loads associated with the devices/structures. Battery life information and driving habit information may be leveraged for selecting an appropriate energy transfer strategy for any given vehicle, traction battery pack, structure, and/or grid power source condition. The proposed systems/methods may thereby align grid demand charge strategies to each vehicle's battery life, thereby preserving the life/warranty and asset utilization of the traction battery pack over the entire usage life of the vehicle. These and other features of this disclosure are discussed in greater detail in the following paragraphs of this detailed description.

Figure 1:
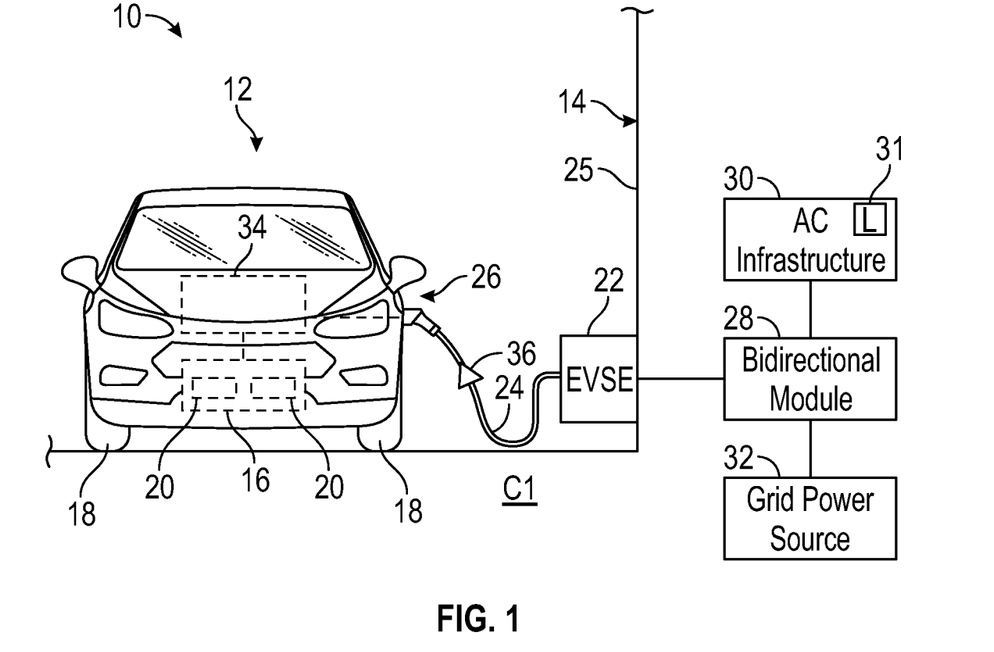
FIG. 1 schematically illustrates a first configuration of a bidirectional energy transfer system.
Figure 2:
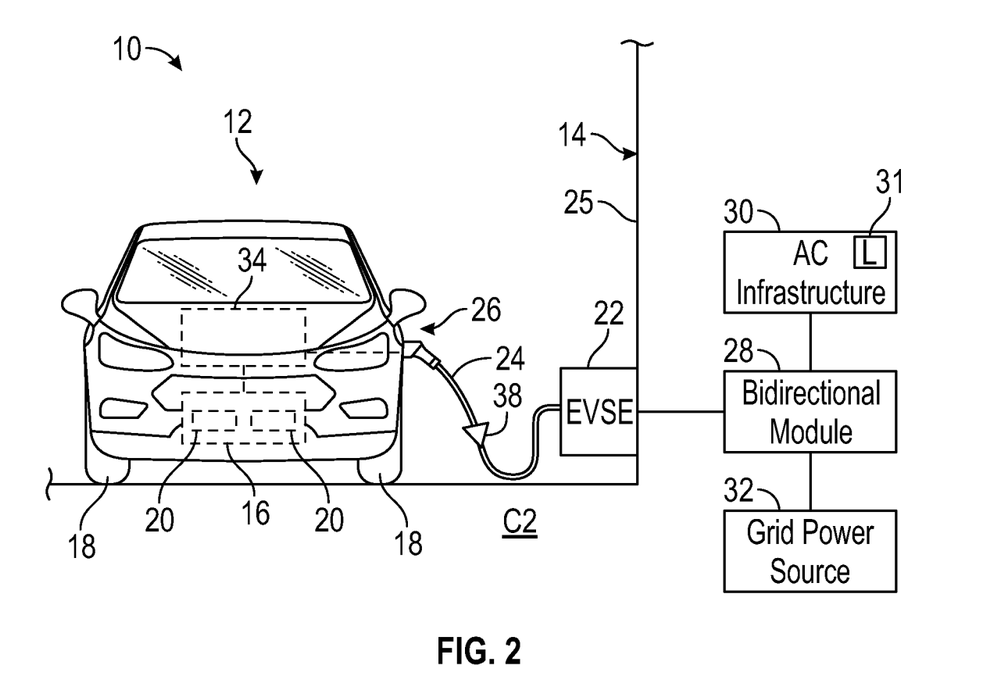
FIG. 2 schematically illustrates a second configuration of the bidirectional energy transfer system of FIG. 1.

FIGS. 1 and 2 schematically illustrate an exemplary bidirectional energy transfer system 10 (hereinafter "the system 10") for bidirectionally transferring energy between an electrified vehicle 12 and a structure 14. The system 10 enables the bidirectional transfer of energy from the electrified vehicle 12 to the structure 14 or vice versa. The structure 14 may be a residential building, a commercial building, a parking garage, a charging station, or any other type of structure that is capable of receiving or transferring energy. In an embodiment, the structure 14 is a garage of a residential home that functions as a "home location" of the electrified vehicle 12.

Although a specific component relationship is illustrated in the figures of this disclosure, the illustrations are not intended to limit this disclosure. The placement and orientation of the various components of the depicted system are shown schematically and could vary within the scope of this disclosure. In addition, the various figures accompanying this disclosure are not necessarily drawn to scale, and some features may be exaggerated or minimized to emphasize certain details of a particular component.

In an embodiment, the electrified vehicle 12 is a plug-in type electrified vehicle (e.g., a plug-in hybrid electric vehicle (PHEV) or a battery electric vehicle (BEV)). The electrified vehicle 12 includes a traction battery pack 16 that is part of an electrified powertrain capable of applying a torque from an electric machine (e.g., an electric motor) for driving drive wheels 18 of the electrified vehicle 12. Therefore, the electrified powertrain of the electrified vehicle 12 may electrically propel the set of drive wheels 18 either with or without the assistance of an internal combustion engine.

The electrified vehicle 12 of FIGS. 1-2 is schematically illustrated as a car. However, other vehicle configurations are also contemplated. The teachings of this disclosure may be applicable for any type of vehicle as the electrified vehicle 12. For example, the electrified vehicle 12 could be configured as a car, a truck, a van, a sport utility vehicle (SUV), etc.

Although shown schematically, the traction battery pack 16 may be configured as a high voltage traction battery pack that includes a plurality of battery arrays 20 (i.e., battery assemblies or groupings of battery cells) capable of outputting electrical power to one or more electric machines of the electrified vehicle. Other types of energy storage devices and/or output devices may also be used to electrically power the electrified vehicle 12.

The electrified vehicle 12 may interface with the structure 14 through an electric vehicle supply equipment (EVSE) 22 in order to perform bidirectional energy transfers of the system 10. In an embodiment, the EVSE 22 is a wall box that may be mounted to a wall 25 of the structure 14. A charge cable 24 may operably connect the EVSE 22 to a charge port assembly 26 of the electrified vehicle 12 for transferring energy between the electrified vehicle 12 and the structure 14. The charge cable 24 may be configured to provide any level of charging (e.g., Level 1 AC charging, Level 2 AC charging, DC charging, etc.).

The EVSE 22 may be operably connected to an AC infrastructure 30 of the structure 14 through a bidirectional energy transfer module 28. Although shown separately from the EVSE 22 in FIG. 1, the bidirectional energy transfer module 28 and the EVSE 22 could be integrated together as part of common module.

Various electrical loads 31, such as household appliance loads, for example, may be associated with the AC infrastructure 30. The electrical loads 31 may sometimes be referred to as transient loads of the AC infrastructure 30 and could include loads associated with common kitchen appliances, washers, dryers, water heaters, air conditioning units, thermostats, household lighting, etc.

Power from a grid power source 32 (e.g., AC power, solar power, wind power, or combinations thereof) and/or power from the electrified vehicle 12 may be selectively communicated to the bidirectional energy transfer module 28. The bidirectional energy transfer module 28 is configured to aid the bidirectional transfers of electrical energy between the electrified vehicle 12 and the structure 14. The bidirectional energy transfer module 28 may include various equipment, including but not limited to an AC/DC converter, a common HVDC bus, an isolation transformer, a DC/DC converter, a control module, etc. for configuring the structure 14 to either receive electrical energy from the electrified vehicle 12 for supporting the electrical loads 31 or send electrical energy to the electrified vehicle 12 for charging the traction battery pack 16. The bidirectional energy transfer module 28 may further be configured to transfer energy from the grid power source 32 to the AC infrastructure 30.

The electrified vehicle 12 may include a bidirectional power transfer system 34 configured for further enabling the bidirectional transfer of power between the electrified vehicle 12 and the structure 14. The bidirectional power transfer system 34 may be operably connected between the charge port assembly 26 and the traction battery pack 16 of the electrified vehicle 12. The bidirectional power transfer system 34 may include various equipment, such as a charger, a converter, a motor controller (which may be referred to as an inverter system controller or ISC), etc. for configuring the electrified vehicle 12 for either receiving electrical energy from the structure 14 or communicating electrical energy to the structure 14. The bidirectional power transfer system 34 may additionally be configured to transfer energy between the traction battery pack 16 and one or more electric motors of the electrified vehicle 12.

One non-limiting example of a suitable bidirectional power transfer system that may be employed for use within the electrified vehicle 12 for achieving bidirectional power transfers is disclosed within US Patent Publication No. 2020/0324665, assigned to Ford Global Technologies, LLC, the disclosure of which is incorporated herein by reference. However, other bidirectional power transfer systems could also be utilized for achieving the bidirectional power transfers within the scope of this disclosure.

FIG. 1 schematically illustrates a first configuration C1 of the system 10. During the first configuration C1, power may be transferred from the structure 14 to the electrified vehicle 12, such as for charging the traction battery pack 16 of the electrified vehicle 12. The direction of energy transfer during the first configuration C1 is schematically depicted by arrow 36.

FIG. 2 schematically illustrates a second configuration C2 of the system 10. During the second configuration C2, power may be transferred from the traction battery pack 16 of the electrified vehicle 12 to the structure 14. The direction of energy transfer during the second configuration C2 is schematically illustrated by arrow 38. In this way, the electrified vehicle 12 may be employed as a backup energy storage system for at least partially powering the electrical loads 31 of the structure 14, such as when power from the grid power source 32 is temporarily unavailable as a result of electrical blackouts, for example.

The system 10 may further be configured to transfer energy from the electrified vehicle 12 to the structure 14 for at least partially powering the electrical loads 31 during demand charge conditions of the grid power source 32. Demand charge conditions are conditions in which the utility service provider adds a surcharge to the costs associated with receiving energy from the grid power source 32 during peak usage times. The system 10 may therefore provide automated solutions for allowing users to limit or even avoid surcharges associate with demand charge conditions by offsetting grid usage with power from the electrified vehicle 12 during the demand charge conditions. These and other aspects of the system 10 are further detailed below.

Figure 3:
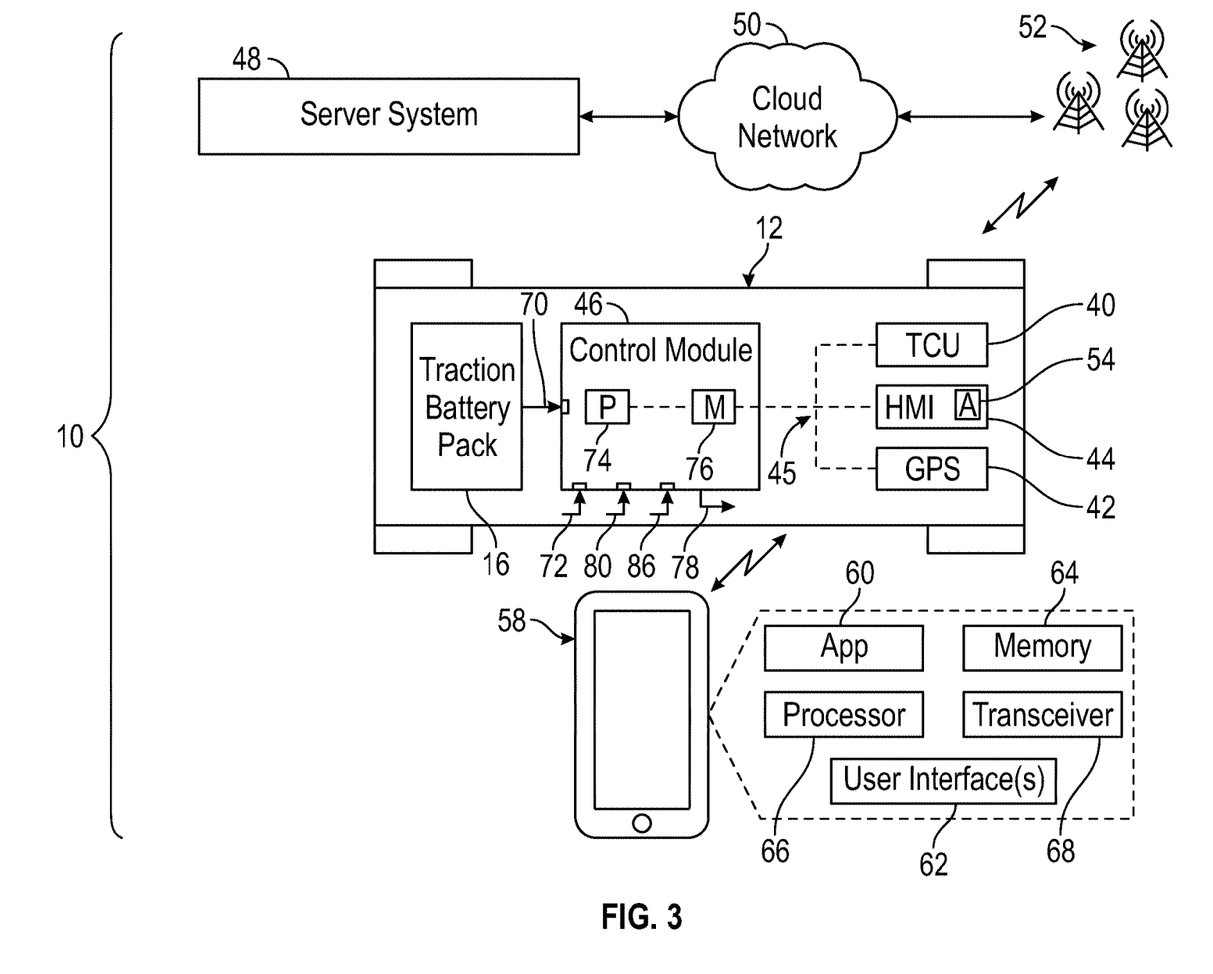
FIG. 3 schematically illustrates exemplary aspects of a bidirectional energy transfer system from the perspective of an electrified vehicle.

Additional aspects of the system 10 of FIGS. 1-2 are further detailed from the perspective of the electrified vehicle 12 in FIG. 3. In particular, FIG. 3 schematically illustrates features that enable the system 10 to coordinate bidirectional energy transfer events between the electrified vehicle 12 and the structure 14, such as for supporting the electrical loads 31, for example.

As part of the system 10, the electrified vehicle 12 may include a telecommunications module 40, a global positioning system (GPS) 42, a human machine interface (HMI) 44, and a control module 46. These and other components may be interconnected and in electronic communication with one another over a communication bus 45 of the electrified vehicle 12. The communication bus 45 may be a wired communication bus such as a controller area network (CAN) bus, or a wireless communication bus such as Wi-Fi®, Bluetooth®, Ultra-Wide Band (UWB), etc.

The telecommunications module 40 may be configured for achieving bidirectional communications with a cloud-based server system 48. The server system 48 may include various servers that store data that may be accessed by the system 10. The telecommunications module 40 may communicate over a cloud network 50 (e.g., the internet) to obtain various information stored on the server system 48 or to provide information to the server system 48 that can subsequently be accessed by the electrified vehicle 12 (and/or other participating vehicles or structures of the system 10). The server system 48 can identify, collect, and store user data associated with the electrified vehicle 12 for validation purposes. Upon an authorized request, data may be subsequently transmitted to the telecommunications module 40 via one or more cellular towers 52 or some other known communication technique (e.g., Wi-Fi®, Bluetooth®, data connectivity, etc.). Upon commands from the control module 46, the telecommunications module 40 can receive data from the server system 48 or can communicate data back to the server system 48 via the cellular tower(s) 52. Although not necessarily shown or described in this highly schematic embodiment, numerous other components may enable bidirectional communications between the electrified vehicle 12 and the server system 48.

In a first embodiment, a user/owner of the electrified vehicle 12 may interface with the server system 48 using the HMI 44. For example, the HMI 44 may be equipped with an application 54 (e.g., FordPass®™ or another similar web-based application) adapted for interfacing with the server system 48. The HMI 44 may be located within a passenger cabin of the electrified vehicle 12 and may include various user interfaces for displaying information to the vehicle occupants and for allowing the vehicle occupants to enter information into the HMI 44. The vehicle occupants may interact with the user interfaces presentable on the HMI 44 via touch screens, tactile buttons, audible speech, speech synthesis, etc.

In another embodiment, the user/owner of the electrified vehicle 12 could alternatively or additionally interface with the server system 48 for coordinating bidirectional energy transfer events using a personal electronic device 58 (e.g., a smart phone, tablet, computer, wearable smart device, etc.). The personal electronic device 58 may include an application 60 (e.g., FordPass®™ or another similar application) that includes programming to allow the user to employ one or more user interfaces 62 for setting or controlling certain aspects of the system 10. The application 60 may be stored in a memory 64 of the personal electronic device 58 and may be executed by a processor 66 of the personal electronic device 58. The personal electronic device 58 may additionally include a transceiver 68 that is configured to communicate with the server system 48 over the cellular tower(s) 52 or some other wireless link.

The GPS 42 is configured to pinpoint locational coordinates of the electrified vehicle 12. The GPS 42 may utilize geopositioning techniques or any other satellite navigation techniques for estimating the geographic position of the electrified vehicle 12 at any point in time. The GPS 42 may additionally store and/or track driving habit information of the user/owner who is associated with the electrified vehicle 12. The driving habit information may include historical drive routes used by the user, planned drive routes, frequently visited locations and expected arrival/departures times at each frequently visited location, home location and expected times parked at home location, etc. The driving habit information may alternatively or additionally be stored in the server system 48 and may be accessed via the applications 54, 60.

The control module 46 may include both hardware and software and could be part of an overall vehicle control system, such as a vehicle system controller (VSC), or could alternatively be a stand-alone controller separate from the VSC. In an embodiment, the control module 46 is programmed with executable instructions for interfacing with and commanding operations of various components of the system 10. Although shown as separate modules within the highly schematic depiction of FIG. 3, the telecommunications module 40, the GPS 42, the HMI 44, and the control module 46 could be integrated together as part of common module of the electrified vehicle 12.

The control module 46 may include a processor 74 and non-transitory memory 76 for executing various control strategies and modes associated with the system 10. The processor 74 can be a custom made or commercially available processor, a central processing unit (CPU), or generally any device for executing software instructions. The memory 76 can include any one or combination of volatile memory elements and/or nonvolatile memory elements.

The processor 74 may be operably coupled to the memory 76 and may be configured to execute one or more programs stored in the memory 76 of the control module 46 based on the various inputs received from other devices, such as the server system 48, the telecommunications module 40, the GPS 42, the HMI 44, the traction battery pack 16, etc. In an embodiment, the application 54 (e.g., FordPass®™ or another similar application), which includes programming for allowing the vehicle user to employ one or more user interfaces within the HMI 44 for setting or controlling certain aspects of the system 10, may be stored in the memory 76 and may be executed by the processor 74 of the control module 46. Alternatively, the control module 46 may be configured to communicate and interface with the personal electronic device 58 for coordinating and/or executing certain aspects of the system 10 through the application 60.

The control module 46 may receive and process various inputs for selecting an energy transfer strategy 78 for best aligning demand charge mitigation to the life of the traction battery pack 16 when transferring energy from the electrified vehicle 12 to the structure 14. The control module 46 may be programmed to select, from a plurality of predefined energy transfer strategies, the energy transfer strategy 78 that is best suited for preserving the life of the traction battery pack 16 for any given vehicle, battery, structure, and/or grid condition. As discussed in further detail below, the selected energy transfer strategy 78 is based on, at least in part, battery health information 70 received from the traction battery pack 16 and driving habit information 72 associated with the electrified vehicle 12. The energy transfer strategy 78 may include, among other information, notifications, protocols, and/or instructions for utilizing the traction battery pack 16 of the electrified vehicle 12 as a backup power source for supporting the electrical loads 31 of the structure 14.

The plurality of predefined energy transfer strategies that are programmed within the control module 46 may include aggressive strategies, assertive strategies, reserved strategies, and extremely reserved strategies. These categories of strategies may embody different levels of aggressiveness for which to support the transient loads of the structure 14. In an embodiment, assertive strategies are considered less aggressive than aggressive strategies, reserved strategies are considered less aggressive than assertive strategies, and extremely reserved strategies are considered less aggressive than reserved strategies. Thus, as explained in further detail herein, when the traction battery pack 16 exhibits a battery life aging model that is relatively poor, a less aggressive energy transfer strategy may be chosen as the energy transfer strategy 78, and when the traction battery pack 16 exhibits a battery life aging model that is relatively healthy, a more aggressive energy transfer strategy may be chosen as the energy transfer strategy 78.

A first exemplary energy transfer strategy that may be chosen as the energy transfer strategy 78 is a dynamic overcompensation strategy, which is considered an aggressive approach for supporting the transient loads of the structure 14. During the dynamic overcompensation strategy, the traction battery pack 16 may be controlled to provide increased energy to the AC infrastructure 30 over a relatively short period of time to account for aggressive electrical loads 31. For example, when one or more of the electrical loads 31 has been consuming greater than a threshold amount of power (e.g., about 1 kW) for greater than a threshold amount of time (e.g., about 10 minutes), the dynamic overcompensation strategy may be selected in order to provide an additional amount of power (e.g., about 10 kW) for a predefined amount of time (e.g., about 1 minute) in order to account for the on-going electrical demand of the electrical loads 31.

Another exemplary energy transfer strategy that may be chosen as the energy transfer strategy 78 is an energy profile pairing strategy, which is considered another aggressive approach. During the energy profile pairing strategy, the traction battery pack 16 may be controlled to provide power to the AC infrastructure 30 in advance of the start of the one or more of the electrical loads 31 in order to eliminate power spikes. The user of the system 10 may be provided the option of selecting a pre-programmed energy profile for various home appliances that are part of the electrical loads 31. The energy profiles may define the amount of power that is to be provided to the AC infrastructure 30 and the amount of time that that power is to be provided, for example, for supporting the transient loads. The energy profiles may be accessed/selected/modified within the applications 54, 60 and may be stored on the server system 48. Alternatively, when no energy profile is available on the server system 48 for a particular electrical load 31, machine learning may be utilized to predict the most appropriate energy profile to use for a given appliance.

Another exemplary energy transfer strategy that may be chosen as the energy transfer strategy 78 for supporting the transient loads is a dynamic matching strategy, which is considered an assertive approach. During the dynamic matching strategy, the traction battery pack 16 may be controlled to provide power to the AC infrastructure 30 only when power spikes associated with a specific electrical load 31 and that exceed a threshold amount occur in order to avoid tripping a main breaker of the structure 14. The control module 46 may establish communications with one or more of the electrical loads 31, such as via the telecommunications module 40, for example, to review the planned consumption of the particular electrical loads 31. For example, when a setting (e.g., temperature, etc.) of a smart appliance (e.g., a thermostat, etc.) has been adjusted to indicate increased power consumption, then the traction battery pack 16 may be controlled to transfer power to the AC infrastructure 30 that is proportional to the amount of energy required to meet the increased power consumption.

Another exemplary energy transfer strategy that may be chosen as the energy transfer strategy 78 is a threshold energy transfer strategy, which is considered another assertive approach. During the threshold energy transfer strategy, the user of the system 10 may select the amount of power to be received from the grid power source 32, and the remaining portion of the power for powering the electrical loads 31 may be provided by the traction battery pack 16. The user may select a baseline energy amount to be consumed by the structure 14, such as within the application 54, 60. If energy consumption of the structure 14 exceeds the baseline energy amount, then the traction battery pack 16 may be controlled to transfer energy to the structure 14 in an amount that is equal to the difference between the actual energy consumption and the baseline energy amount. If the actual energy consumption of the structure 14 is less than the baseline energy amount, then the traction battery pack 16 may receive power from the structure 14 in an amount that is equal to the difference between the baseline energy amount and the actual energy consumption.

Another exemplary energy transfer strategy that may be chosen as the energy transfer strategy 78 is a range reserve strategy, which is considered a type of reserved strategy. During the range reserve strategy, the user may pre-select specific schedules, time blocks, and/or range requirements for controlling the transfer of energy from the electrified vehicle 12 to the structure 14 in order to protect the range reserve of the traction battery pack 16. These settings may be made/adjusted within the application 54, 60. The settings may include a total energy transfer amount to provide to the structure 14, a total energy reserved amount to retain to protect the range reserve of the traction battery pack 16, a set schedule for transferring power to the structure 14, a set time block for transferring power to the structure 14, etc. In an embodiment, the amount of the range reserved can vary dynamically based on current demand charge costs and predicted vehicle usage during an upcoming time period.

Yet another exemplary energy transfer strategy that may be chosen as the energy transfer strategy 78 is a targeted appliance status strategy, which is considered an extremely reserved strategy. During the targeted appliance status strategy, the traction battery pack 16 may be controlled to provide power to the AC infrastructure 30 only when specific electrical loads 31 of the structure 14 are in use. The control module 46 may establish communications with one or more of the electrical loads 31, such as via the telecommunications module 40, for example, to review the real-time energy consumption of the particular electrical loads 31. For example, when an appliance (e.g., a hot tub, etc.) is turned on, the traction battery pack 16 may be controlled to transfer a predefined amount of power to the AC infrastructure 30 for accommodating the energy loads associated with the turned on electrical load 31. The energy transfer may automatically end when the electrical load 31 is turned off.

The above energy transfer strategies are to be interpreted as exemplary only. Other energy transfer strategies could alternatively or additionally be provided and are contemplated within the scope of this disclosure.

The control module 46 may receive various inputs that may be utilized for selecting the energy transfer strategy 78 that is most appropriate for any given structure/vehicle/battery/grid condition. One such input to the control module 46 may include battery health information 70 received from the traction battery pack 16. The battery health information 70 may include battery-related information such as the state of charge (SOC), battery cell temperatures, depth-of-discharge mapping (e.g., fraction/percentage of capacity removed from fully charge battery), internal resistance (e.g., efficiency of battery/thermal stability of charge converted to heat), etc.

The battery health information 70 may be analyzed by the control module 46 and inputted to a battery life modeler for assessing the aging and overall health of the traction battery pack 16. The battery life modeler may assess the battery health information 70 using various criteria. A first criteria may balance total life battery reduction costs with the cost of meeting demand charge offsets in order to determine whether to select an aggressive or a mild energy transfer strategy as the energy transfer strategy 78. For example, an aggressive strategy may be chosen when battery degradation/aging is not near peak, and a less aggressive strategy may be chosen when battery degradation/aging is near peak.

A second criteria that may be utilized by the battery life modeler may compare prediction models with battery warranty conditions (e.g., based on years and miles). The prediction models may calculate the current warranty period of the traction battery pack 16 and then select the energy transfer strategy that is most appropriate for meeting the end of warranty period. For example, a traction battery pack that has a higher high voltage capacity may be controlled using more aggressive energy transfer strategies than can be used with a traction battery pack having a lower high voltage capacity for meeting a desired high voltage capacity at the end of the respective warranty period.

A third criteria that may be utilized by the battery life modeler relates to the DC fast charge utilization of the traction battery pack 16. The battery life modeler may determine the frequency of charging the traction battery pack 16 using DC fast charging and/or other types of high cycling charging. Aggressive energy transfer strategies may be chosen as the energy transfer strategy 78 when usage of high cycling charging is relatively low, and less aggressive energy transfer strategies may be chosen as the energy transfer strategy 78 when usage of high cycling charging is relatively high.

Another input to the control module 46 may include driving habit information 72 of the user associated with the electrified vehicle 12. The driving habit information 72 may include historical drive routes used by the user, upcoming drive routes planned by the user, frequently visited locations and expected arrival/departures times, home location and expected times parked at home location, etc. The driving habit information 72 may be received from the GPS 42 or from the server system 48 via the applications 54, 60.

Another input to the control module 46 may include a plug connection status signal 86 from the charge port assembly 26 for indicating whether or not the electrified vehicle 12 is "on-plug" (e.g., whether or not the charge cable 24 is currently plugged into the charge port assembly 26).

Another input to the control module 46 may include household information 80 associated with the structure 14. The household information 80 may include pre-programmed or machine learning energy profiles for various home appliances that are part of the electrical loads 31, historical energy usage (e.g., energy logs), smart meter readings (e.g., current consumption of total energy in readings through voltage, current, and power factor levels), smart appliance information (e.g., status of appliance use, notifications, energy profiles, etc.), customer preference information (e.g., customer energy transfer settings received from the applications 54, 60, etc.), etc.

In an embodiment, the control module 46 may be programmed to automatically switch from the energy transfer strategy 78 to a different energy transfer strategy when the battery life modeler and other conditions so dictate. The system 10 therefore may dynamically control the electrified vehicle 12 for supporting the transient loads of the structure 14.

In another embodiment, the control module 46 may be programmed to command that one or more prompts/notifications be communicated to the user of the electrified vehicle 12, such as when the electrified vehicle 12 is unable to meet the current transient loads of the structure 14. The prompts/notifications may be displayed as a message on the HMI 44 or the personal electronic device 58, for example, and may include prompts for adjusting the energy transfer settings, prompts for indicating a dynamic change to the energy transfer strategy being used (e.g., change from a mild to an aggressive strategy or vice versa), prompts for requesting charging of the traction battery pack 16 to support the transient loads, prompts for indicating the need for vehicle servicing, etc.

In yet another embodiment, the control module 46 may interface with and control the functionality of the bidirectional power transfer system 34 and the bidirectional energy transfer module 28 for coordinating and commanding either the first configuration C1 or the second configuration C2 of the system 10 during bidirectional energy transfer events.

Figure 4:
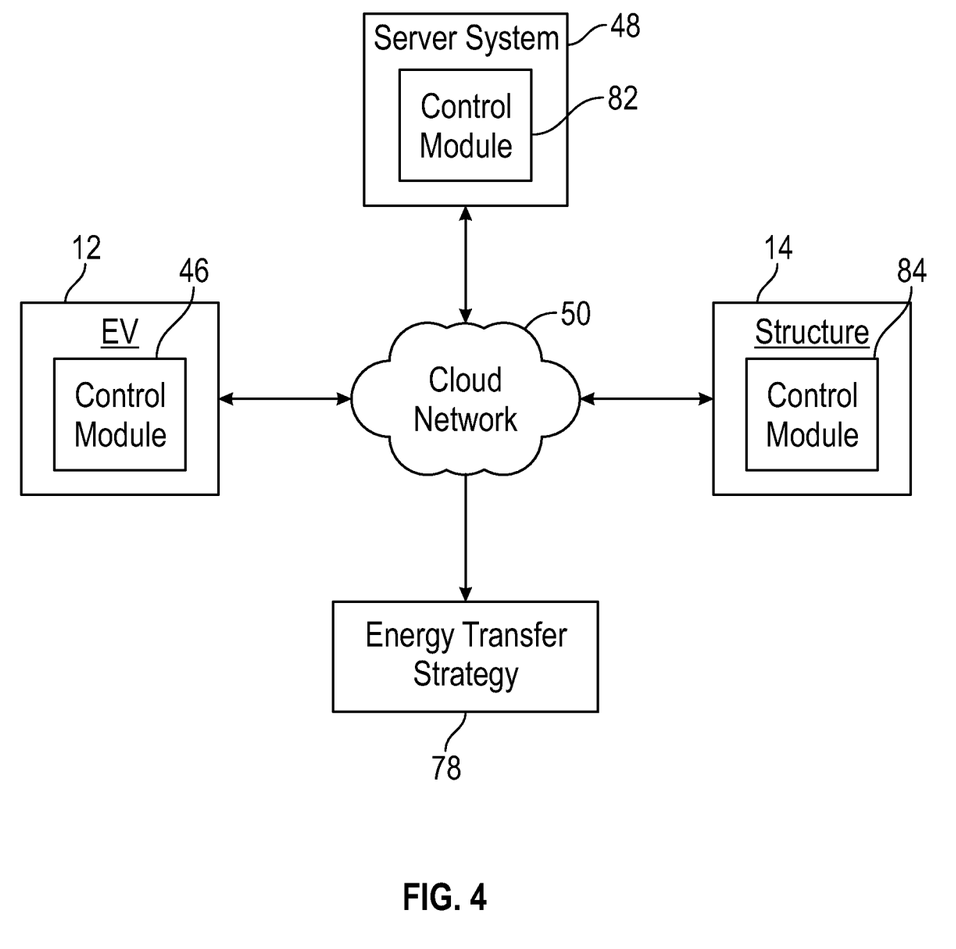
FIG. 4 schematically illustrates another exemplary bidirectional energy transfer system.

In the embodiments described above, the control module 46 of the electrified vehicle 12 may be configured to function as the communications hub of the system 10. However, other embodiments are also contemplated within the scope of this disclosure. For example, as shown in FIG. 4, a control module 82 of the server system 48 (e.g., a cloud-based control module) and/or a control module 84 associated with the structure 14 could be configured to function as the communications hub of the system 10. In yet another embodiment, the respective control modules of each of the electrified vehicle 12, the structure 14, and the server system 48 may operate together over the cloud network 50 to establish a control system for controlling the functionality of the system 10, such as for selecting and executing the energy transfer strategy 78 that is most appropriate for any given situation.

FIGS. 5A-5E, with continued reference to FIGS. 1-4, schematically illustrate in flow chart form an exemplary method 100 for selecting and executing the energy transfer strategy 78 that is most appropriate for any given situation/condition indicated by the electrified vehicle 12, the traction battery pack 16, the structure 14, the grid power source 32, etc. The system 10 may be configured to employ one or more algorithms adapted to execute at least a portion of the steps of the exemplary method 100. For example, the method 100 may be stored as executable instructions in the memory 76 of the control module 46, and the executable instructions may be embodied within any computer readable medium that can be executed by the processor 74 of the control module 46. The method 100 could alternatively or additionally be stored as executable instructions in the memories of the control module 82 of the server system 48 and/or the control module 84 of the structure 14.

Figure 5A:
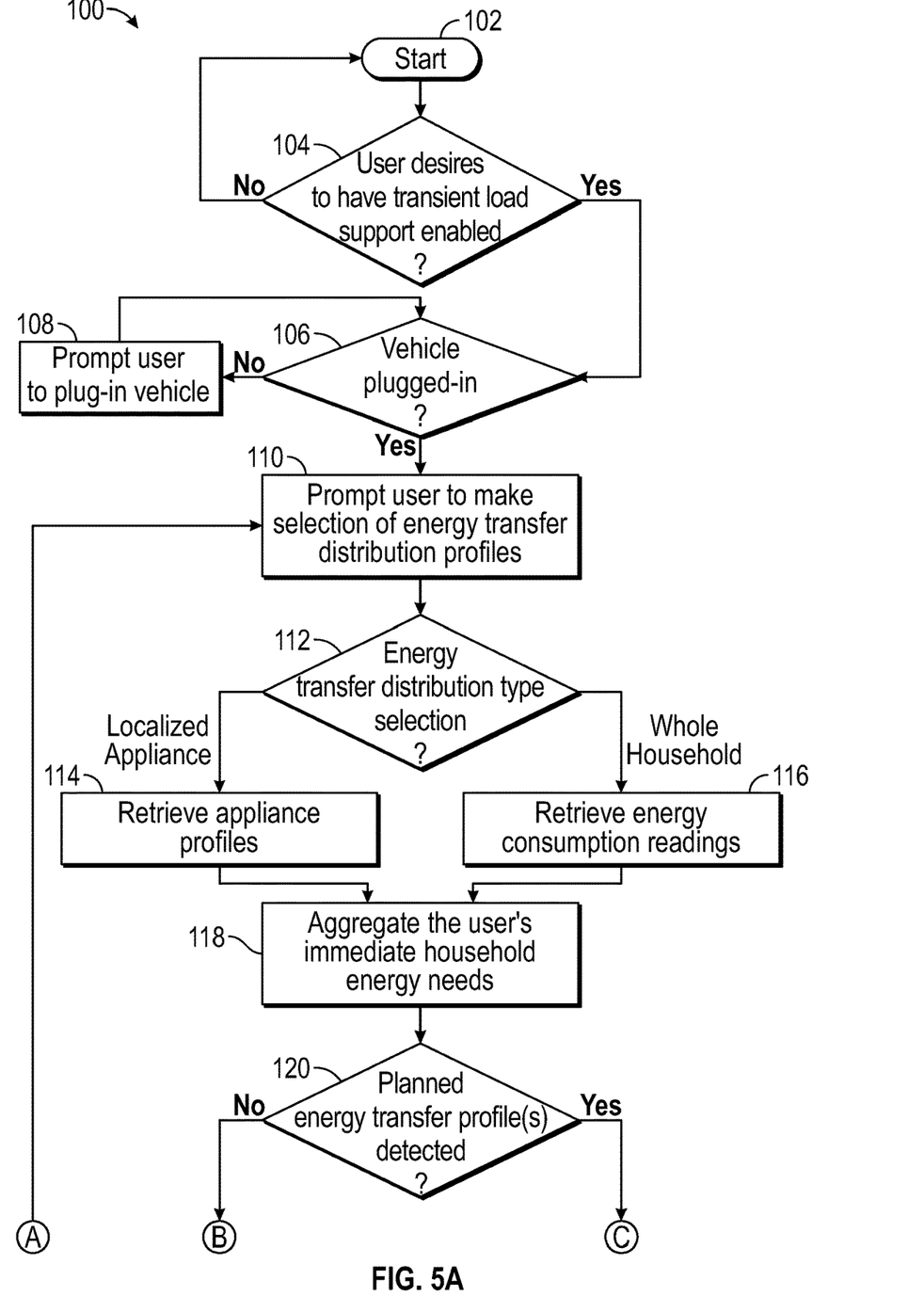
FIGS. 5A, 5B, 5C, 5D, and 5E illustrate a flow chart of an exemplary method for coordinating and providing automated bidirectional energy transfer support selection for supporting transient loads based, at least on part, on battery life modeling.

The exemplary method 100 may begin at block 102. At block 104, the method 100 may determine whether the user of the electrified vehicle 12 desires to support the transient loads of the structure 14. If YES, the method 100 may proceed to block 106 by determining whether or not the electrified vehicle 12 is plugged-in (e.g., whether the charge cable 24 is currently connected to the charge port assembly 26 of the electrified vehicle 12 and the EVSE 22). If NO, the user of the electrified vehicle 12 may be prompted to plug-in the electrified vehicle 12 at block 108. Alternatively, if a YES flag is returned at block 106, the method 100 may proceed to block 110 by prompting the user to make his/her desired selections of energy transfer distribution profiles. The prompt may be provided on the HMI 44 or the personal electronic device 58, for example.

The method 100 may next determine what type of energy distribution profile has been selected at block 112. If one or more localized appliance profiles have been selected, the method 100 may retrieve appliance information from the one or more selected appliances at block 114. Alternatively, if an energy transfer distribution profile for the entire structure 14 has been selected, the method 100 may retrieve energy consumption (e.g., smart meter) readings from the structure 14 at block 116. The immediate total energy needs of the structure 14 may then be aggregated at block 118.

At block 120, the method 100 may determine whether any planned energy transfer profiles have been detected. Planned energy transfer profiles may include appliance settings that are scheduled to occur at a later time, such as those from a smart thermostat, for example. If YES, the planned energy transfer profiles may be retrieved at block 122, and the user's predicted energy needs for the structure 14 may then be aggregated at block 124.

At block 126, a historical energy transfer profile associated with the structure 14 may be retrieved, such as from the server system 48 or from a smart meter. The historical energy transfer profile may include energy logs of previous usages associated with the structure 14, for example. The user's previous energy needs for the structure 14 may then be aggregated at block 128.

If a NO flag is returned at block 120, the method 100 may proceed to block 130 by prompting the user if they wish to link a planned energy transfer profile. The method 100 may then determine whether a planned energy transfer profile has been linked at block 132. The method 100 may proceed to either block 122 or block 126 from block 132, depending on whether or not a planned energy transfer profile was linked at block 132.

Figure 5B:
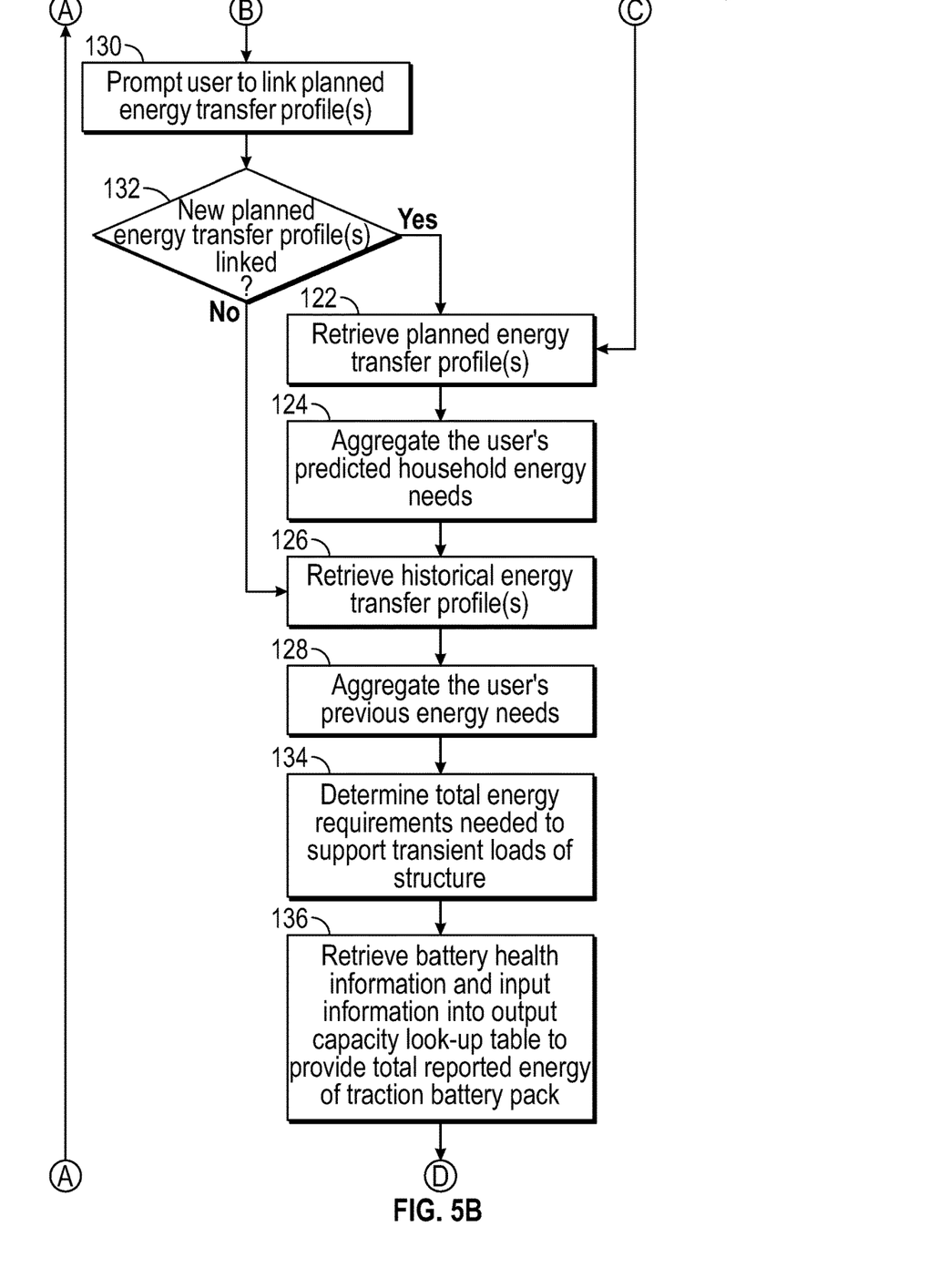

The total energy requirements needed to support the transient loads of the structure 14 may be calculated at block 134. This step may include aggregating the immediate energy needs (from block 118), the predicted energy needs (from block 124), and the previous energy needs (from block 128) associated with the structure 14.

Next, at block 136, the method 100 may retrieve the battery health information 70 and output the battery health information 70 into an output capacity lookup table to provide a total reported energy of the traction battery pack 16. In an embodiment, the output capacity lookup table is stored in the memory 76 of the control module 46.

The method 100 may determine whether any energy transfer preferences, such as preferences for range reservations, for example, have been selected by the user at block 138. If YES, the method 100 may aggregate the user's selected energy reserve for the traction battery pack 16 at block 140. If NO, the method 100 may proceed to block 142 by prompting the user to select a desired amount of range reserve. The method 100 may then determine whether a range reservation has been selected at block 144. The method 100 may proceed to either block 140 or block 146 from block 144, depending on whether or not a range reservation has been made.

At block 146, the method 100 may determine whether a user profile associated with the owner of the electrified vehicle 12 and/or structure 14 has been linked to the system 10. If YES, the driving habit information 72 associated with the user may be retrieved at block 148. If NO, the method 100 may instead proceed to block 150 by prompting the user as to whether they wish to link a user profile to the system 10. The method 100 may then determine whether a user profile has been linked at block 152. The method 100 may proceed to either block 148 or block 156 from block 152, depending on whether or not a user profile has been linked.

The user's predicted energy reserve of the traction battery pack 16 may be aggregated at block 154. The user's previous energy reserve of the traction battery pack 16 may be aggregated at block 156.

Figure 5C:
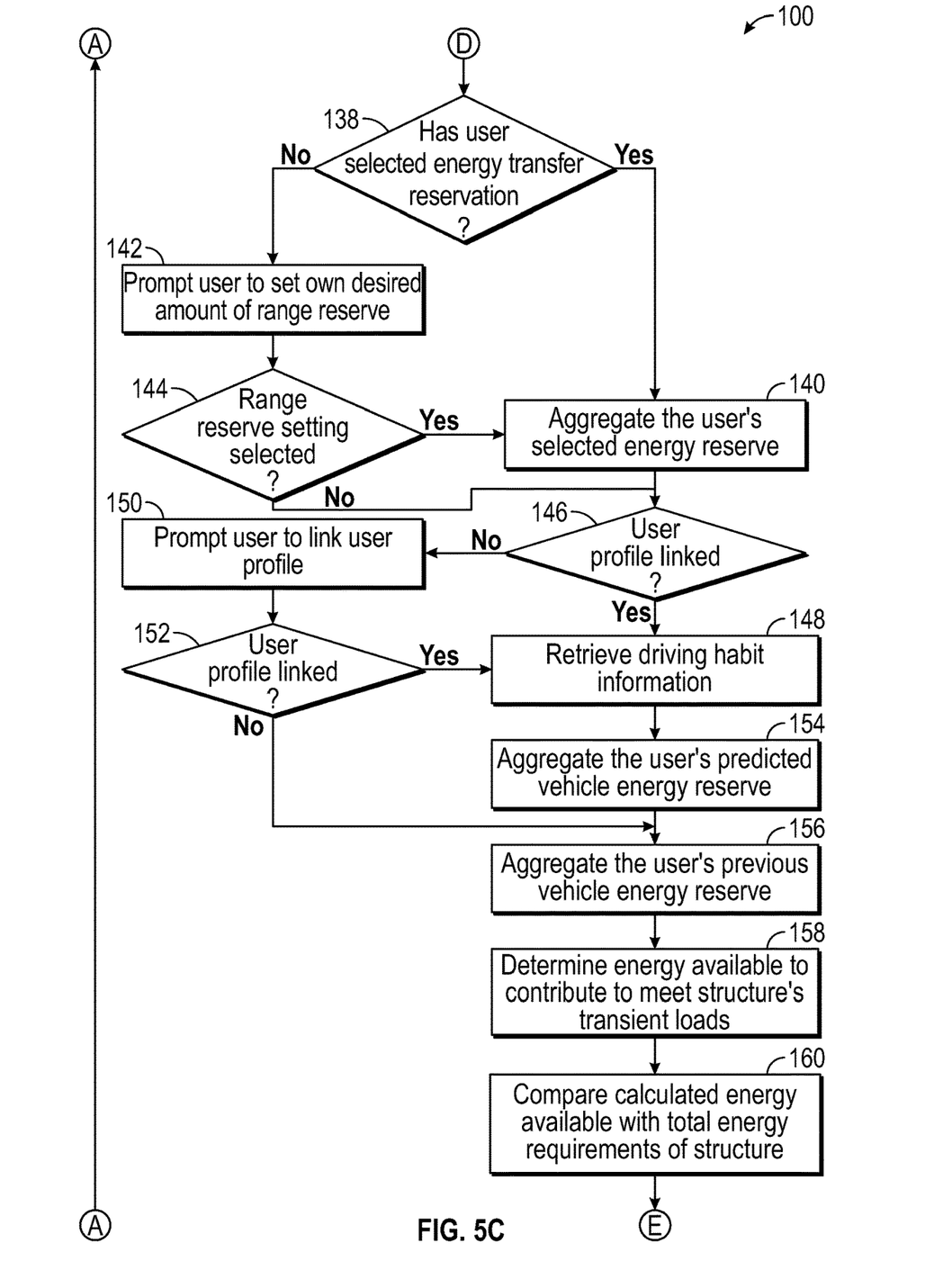

The portion of energy of the traction battery pack 16 that is available to contribute to the transient loads of the structure 14 may next be calculated at block 158. If the selected energy reserve (from block 140) is less than or equal to the sum of the predicted energy reserve and the previous energy reserve, then the portion of energy of the traction battery pack 16 that is available to contribute may be calculated by subtracting the sum of the predicted energy reserve and the previous energy reserve from the total reported energy of the traction battery pack 16. Otherwise, the selected energy reserve may be simply subtracted from the total reported energy of the traction battery pack 16 to calculate the portion of energy that is available to contribute to the transient loads of the structure 14.

Next, at block 160, the portion of energy of the traction battery pack 16 that is available to contribute to the transient loads of the structure 14 (from block 158) may be compared to the total energy requirements of the structure 14 (from block 134). The method 100 may then, at block 162, determine whether the portion of the energy available from the traction battery pack 16 exceeds the total energy requirements of the structure 14. If NO, the method 100 may proceed to block 164 by notifying the user of the inability to support the transient loads under the current energy settings. The method 100 may determine if the user is willing to adjust the energy settings at block 166. If YES, the method 100 may return to block 110. If NO, the method 100 may end at block 168.

Alternatively, if a YES flag is returned at block 162, the method 100 may proceed to block 170. At this step, the method 100 may input the battery health information 70 into a battery life modeler. In an embodiment, the battery life modeler is a software package that can be stored in the memory 76 and executed by the processor 74 of the control module 46.

Figure 5D:
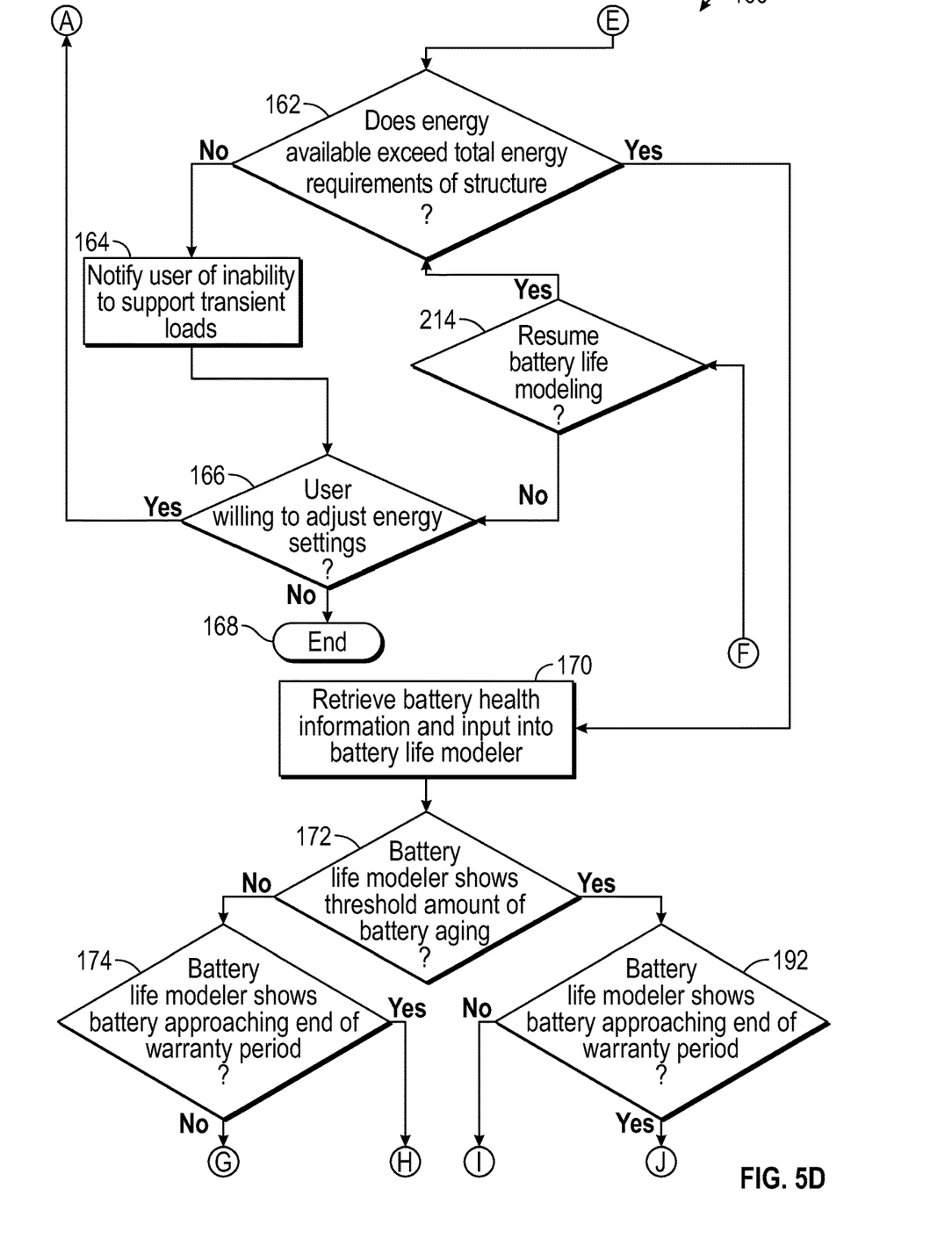

The method 100 may next determine whether the battery life modeler indicates that the traction battery pack 16 exhibits a threshold amount of battery aging at block 172. If NO, the method 100 may determine whether the battery life modeler indicates that the traction battery pack 16 is approaching the end of its warranty period at block 174. If a NO flag is returned at block 174, the method 100 may determine that an aggressive energy transfer strategy is appropriate for supporting the transient loads of the structure 14 at block 176. The method 100 may then, at block 178, determine whether the difference between the portion of available energy of the traction battery pack 16 and the total energy requirements of the structure 14 exceeds a predefined threshold (e.g., 20 kWh or some other threshold amount). If YES, the dynamic overcompensation strategy may be selected as the energy transfer strategy 78 at block 180. If NO, the energy profile pairing strategy may be selected as the energy transfer strategy 78 at block 182.

Alternatively, if a YES flag is returned at block 174, the method 100 may determine that an assertive energy transfer strategy is more appropriate for supporting the transient loads at block 184. The method 100 may then, at block 186, determine whether the difference between the portion of available energy of the traction battery pack 16 and the total energy requirements of the structure 14 exceeds the predefined threshold. If YES, the dynamic matching strategy may be selected as the energy transfer strategy 78 at block 188. If NO, the threshold energy transfer strategy may be selected as the energy transfer strategy 78 at block 190.

Alternatively, if the battery life modeler indicates that the traction battery pack 16 does exhibit a threshold amount of battery aging at block 172, the method 100 may proceed to block 192 instead of block 174. At block 192, the method 100 may determine whether the battery life modeler indicates that the traction battery pack 16 is approaching the end of its warranty period. If a NO flag is returned at block 192, the method 100 may determine that a reserved energy transfer strategy is more appropriate for supporting the transient loads of the structure 14 at block 194. The method 100 may then, at block 196, determine whether the difference between the portion of available energy of the traction battery pack 16 and the total energy requirements of the structure 14 exceeds the predefined threshold. If YES, the threshold energy transfer strategy may be selected as the energy transfer strategy 78 at block 190. If NO, the range reserve strategy may be selected as the energy transfer strategy 78 at block 198.

Alternatively, if a YES flag is returned at block 192, the method 100 may determine that an extremely reserved energy transfer strategy is most appropriate for supporting the transient loads at block 200. The method 100 may then select the targeted appliance status strategy, which is the least aggressive strategy, as the energy transfer strategy 78 at block 202.

Figure 5E:
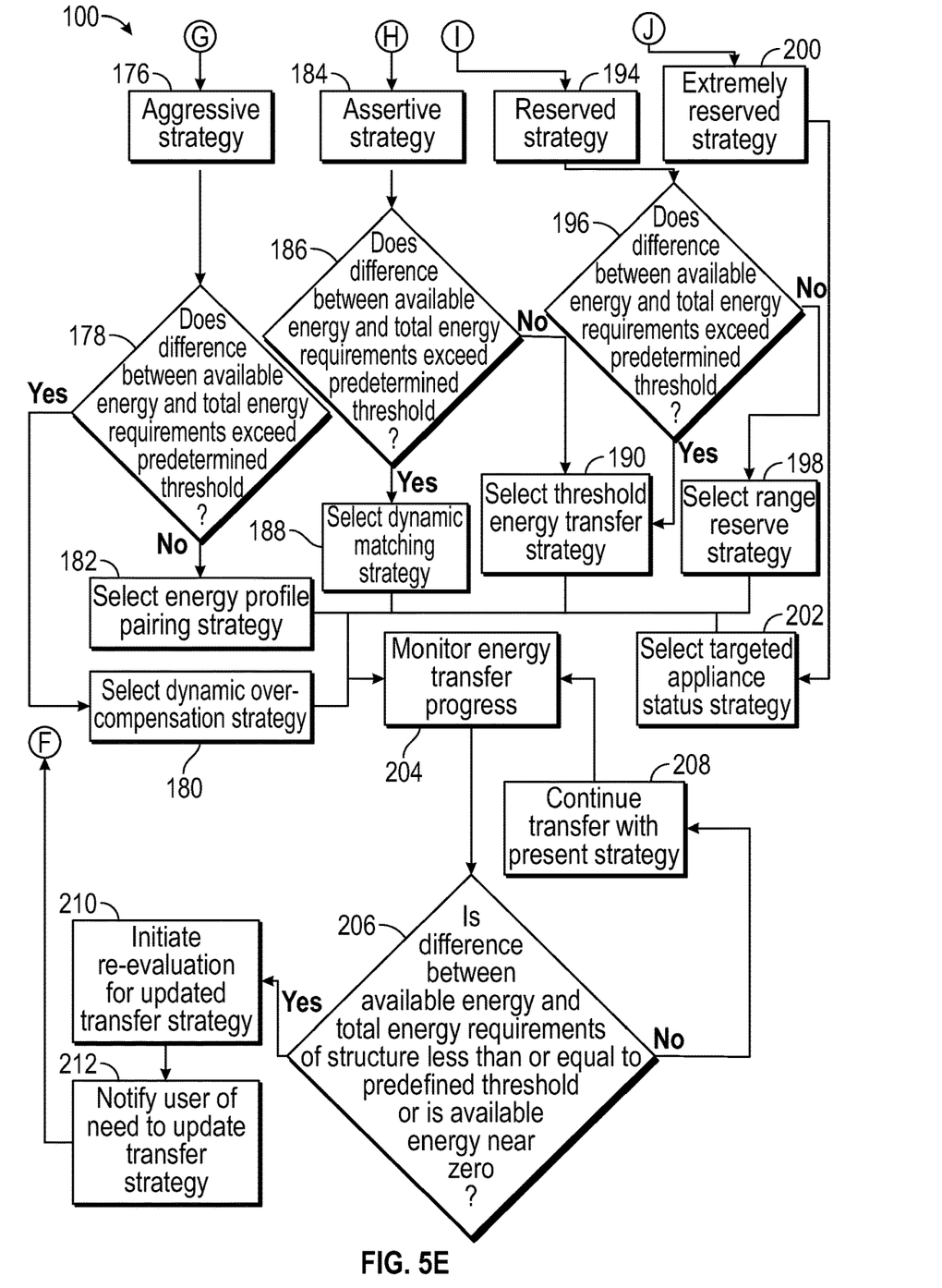

From any of blocks 180, 182, 188, 190, 198, or 202, the method 100 may proceed to block 204. At this step, the progress of the energy transfer output from the electrified vehicle 12 to the structure 14 is monitored. At block 206, the method 100 may determine whether the difference between the portion of available energy of the traction battery pack 16 and the total energy requirements of the structure 14 is less than or equal to the predefined threshold, or whether the portion of available energy of the traction battery pack is nearing zero. If NO, the energy transfer is continued by using the previously selected energy transfer strategy 78 at block 208.

However, if the method 100 determines that the difference between the portion of available energy of the traction battery pack 16 and the total energy requirements of the structure 14 is less than or equal to the predefined threshold, or that the portion of available energy is nearing zero, the method 100 may initiate a re-evaluation of the energy transfer strategy 78 at block 210. The method 100 may then proceed to block 212 by notifying the user of the need to update the energy transfer strategy. The method 100 may determine whether the user wishes to resume battery life modeling for providing automated transient load energy transfer strategy selection at block 214. If YES, the method 100 may return to block 162 for continued analysis and further action. If NO, the method 100 may return to block 166 for continued analysis and further action. If the user is unwilling to adjust the current energy settings at block 166, the method 100 may end at block 168.

The bidirectional energy transfer systems of this disclosure are designed to coordinate bidirectional energy transfer events between participants based on both battery life models and user driving habits. The systems/methods provide a more consumer friendly/hands-off approach with respect to vehicle battery health while balancing the energy consumption needs of the user. The systems/methods are configured to align demand charge mitigation strategies to vehicle battery life, thereby preserving battery life/warranty and improving overall asset utilization and residual value of the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A bidirectional energy transfer system, comprising:
   a traction battery pack; and
   a control module programmed to control a bidirectional energy transfer output of the traction battery pack based at least on battery health information associated with the traction battery pack and driving habit information of a user who is associated with an electrified vehicle that is powered by the traction battery pack,
   wherein the battery health information includes an amount of battery aging and the driving habit information includes historical drive routes used by the user and upcoming drive routes planned by the user, frequently visited locations and expected arrival/departures times, a home location, and expected times parked at the home location
   wherein the control of the bidirectional energy transfer output includes selecting an energy transfer strategy for conducing the energy transfer output,
   wherein the control module is further programmed to select a more aggressive energy transfer strategy as the energy transfer strategy when the battery aging is not near peak or when a high cycling charging usage of the traction battery pack is less than a predefined threshold,
   wherein the control module is further programmed to select a less aggressive energy transfer strategy as the energy transfer strategy when the battery aging is near peak or when the high cycling charging usage of the traction battery pack is greater than the predefined threshold.

2. The system as recited in claim 1, wherein the control module is further programmed to analyze the battery health information within a battery life modeler to derive the amount of battery aging.

3. The system as recited in claim 2, wherein the control module is further programmed to analyze the battery health information within the battery life modeler to determine a remaining warranty period of the traction battery pack.

4. The system as recited in claim 3, wherein the control module is further programmed to select the energy transfer strategy that is most appropriate for ensuring that the traction battery pack reaches an end of the remaining warranty period.

5. The system as recited in claim 1, wherein the control module is a component of the electrified vehicle that is powered by the traction battery pack.

6. The system as recited in claim 1, wherein the control module is a component of a cloud-based storage system or a structure that is configured to receive the bidirectional energy transfer output from the traction battery pack.

7. The system as recited in claim 1, wherein the control module is further programmed to select the energy transfer strategy from a plurality of energy transfer strategies, and further wherein the plurality of energy transfer strategies include at least one aggressive strategy, at least one assertive strategy, at least one reserved strategy, and at least one extremely reserved strategy.

8. The system as recited in claim 7, wherein the at least one assertive strategy is a less aggressive strategy than the at least one aggressive strategy, the at least one reserved strategy is a less aggressive strategy than the at least one assertive strategy, and the at least one extremely reserved strategy is a less aggressive strategy than the at least one reserved strategy.

9. The system as recited in claim 1, wherein the control module is programmed to control the bidirectional energy transfer output from the traction battery pack to a structure for powering a transient load of the structure.

10. The system as recited in claim 9, wherein the structure is a household associated with the electrified vehicle that is powered by the traction battery pack.

11. The system as recited in claim 9, wherein the control module is further programmed to command a notification to the user of the electrified vehicle in response to determining that the traction battery pack has an insufficient amount of energy reserve available to support the transient load of the structure under current settings associated with the energy transfer strategy.

12. A method, comprising:
   controlling, via a control module of a bidirectional energy transfer system, a bidirectional energy transfer output from a traction battery pack of an electrified vehicle to a structure that is separate from the electrified vehicle,
   wherein controlling the bidirectional energy transfer output includes selecting an energy transfer strategy that is based at least on battery health information of the traction battery pack and driving habit information of a user who is associated with the electrified vehicle that is powered by the traction battery pack,
   wherein the battery health information includes an amount of battery aging and the driving habit information includes historical drive routes used by the user and upcoming drive routes planned by the user, frequently visited locations and expected arrival/departures times, a home location, and expected times parked at the home location, wherein the control module is further programmed to select a more aggressive energy transfer strategy as the energy transfer strategy when the battery aging is not near peak or when a high cycling charging usage of the traction battery pack is less than a predefined threshold, wherein the control module is further programmed to select a less aggressive energy transfer strategy as the energy transfer strategy when the battery aging is near peak or when the high cycling charging usage of the traction battery pack is greater than the predefined threshold.

13. The method as recited in claim 12, wherein the structure is a household associated with the electrified vehicle.

14. The method as recited in claim 12, wherein selecting the energy transfer strategy includes:
inputting the battery health information into a battery life modeler; and
deriving the amount of battery aging of the traction battery pack from the battery life modeler.

15. The method as recited in claim 14, comprising:
deriving a remaining warranty period of the traction battery pack from the battery life modeler.

16. The method as recited in claim 15, comprising:
selecting a more aggressive energy transfer strategy as the energy transfer strategy when the amount of the battery aging does not exceed a predefined amount of aging or when the remaining warranty period is not near an end of the warranty period; and
selecting a less aggressive energy transfer strategy as the energy transfer strategy when the amount of the battery aging exceeds the predefined amount of aging or when the remaining warranty period is near the end of the warranty period.

17. The method as recited in claim 12, comprising:
determining a total energy requirement of the structure;
determining an amount of energy available from the traction battery pack for supporting a transient load of the structure; and
controlling the bidirectional energy transfer output from the traction battery pack to the structure only when the amount of energy available from the traction battery pack exceeds the total energy requirement of the structure.

18. The method as recited in claim 17, comprising:
notifying the user that the electrified vehicle is uncapable of supporting the transient load when the total energy requirement of the structure is greater than the amount of energy available from the traction battery pack; and
prompting the user to adjust an energy setting associated with the bidirectional energy transfer output.

19. The method as recited in claim 17, wherein the amount of energy available from the traction battery pack is derived from the driving habit information.

20. A bidirectional energy transfer system, comprising:
a traction battery pack; and
a control module programmed to control a bidirectional energy transfer output of the traction battery pack based at least on battery health information associated with the traction battery pack and driving habit information of a user who is associated with an electrified vehicle that is powered by the traction battery pack, wherein the battery health information includes an amount of battery aging that is derived by analyzing the battery health information within a battery life modeler, wherein the driving habit information includes historical drive routes used by the user, upcoming drive routes planned by the user, frequently visited locations and expected arrival/departures times, a home location, and expected times parked at the home location, wherein the control of the bidirectional energy transfer output includes selecting an energy transfer strategy for conducing the bidirectional energy transfer output, wherein the control module is further programmed to select a more aggressive energy transfer strategy as the energy transfer strategy when the battery aging is not near peak or when a high cycling charging usage of the traction battery pack is less than a predefined threshold, wherein the control module is further programmed to select a less aggressive energy transfer strategy as the energy transfer strategy when the battery aging is near peak or when the high cycling charging usage of the traction battery pack is greater than the predefined threshold.

* * * * *